J. J. COSGROVE.
WATER CLOSET CONNECTION.
APPLICATION FILED SEPT. 10, 1909.

961,685.

Patented June 14, 1910.

Witnesses

Inventor
Joseph J. Cosgrove
by
Connolly Bros.
Attorneys

UNITED STATES PATENT OFFICE.

JOSEPH J. COSGROVE, OF PHILADELPHIA, PENNSYLVANIA.

WATER-CLOSET CONNECTION.

961,685.

Specification of Letters Patent. Patented June 14, 1910.

Application filed September 10, 1909. Serial No. 517,133.

*To all whom it may concern:*

Be it known that I, JOSEPH J. COSGROVE, a citizen of the United States, residing at Philadelphia, in the county of Philadelphia and State of Pennsylvania, have invented certain new and useful Improvements in Water-Closet Connections, of which the following is a specification.

This invention has relation to water closet connections and has for its object the provision of novel means for connecting a water-closet, or similar article which rests on the floor, to a soil pipe, in such manner as to avoid the breaking of the soil pipe or of the floor flange of the closet or the floor flange of the connection or any other damage to the closet, the connection, the soil pipe or any of the several joints thereof, by the settlement of the soil pipes.

A further object of the invention is to prevent the water-closet being raised from the floor and held in that position by the settlement or shrinking of the walls or floors of the building and a still further object of the invention is to provide means for vertically adjusting the seat formed in the soil pipe connection for the reception of the end of the outlet passage of the closet.

It has been found that in many cases, particularly where water-closets are installed in new buildings, the building or the soil pipe or both, are liable to settle and either break or disarrange some of the parts and permit leakage of water or gas and this invention consists in the provision of a novel form of expansible and flexible connection between the water-closet and the soil pipe which will permit of relative movement of these parts without detriment to either or impairment of any of the joints therebetween.

In carrying my invention into effect I provide an expansible and flexible connection pipe or conduit composed of flexible metal such as lead, copper or the like, circumferentially corrugated or ribbed and grooved or undulated so as to permit of its being expanded or contracted lengthwise without fracture. This connection pipe or conduit is attached at one end to the soil pipe and at the other end to a flanged bell or socket that receives the projecting portion of the outlet passage of the closet and permits of any possible relative movement of the closet and soil pipe due to shrinkage or settlement or any other movement of the building or soil pipe without detriment or damage to any of the parts, joints or connections.

Figure 1:
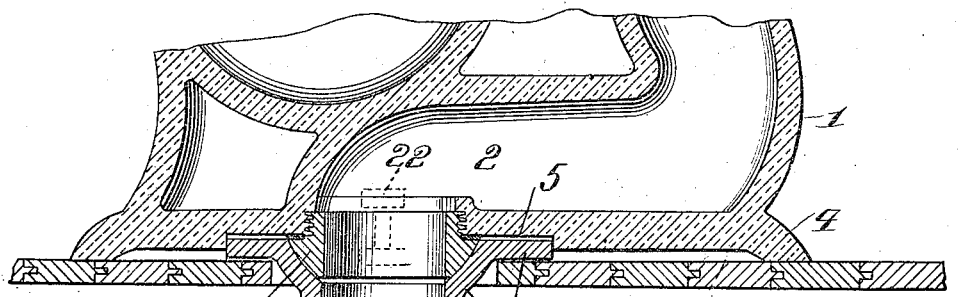
Figure 2:
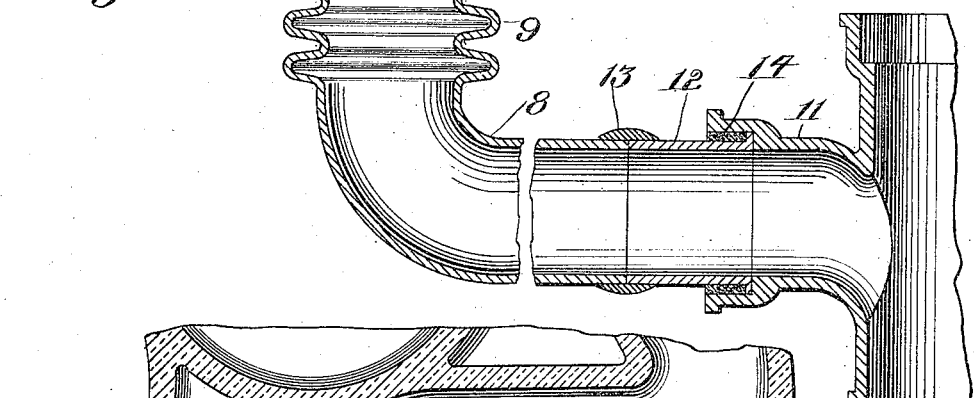

Referring to the accompanying drawings: Figure 1 is a vertical sectional view of a portion of a water-closet and a portion of a vertically arranged soil pipe with my improved connection applied thereto. Fig. 2 is a similar view showing my connection in modified form applied to a horizontally arranged soil pipe.

The bowl or closet is designated 1 and is of the usual or any desired type and is formed with the outlet passage 2, terminating in a projection 3, which may be, as shown, a metallic thimble screwing into the mouth of the outlet passage. The floor flange of the closet is designated 4 and is hollowed out at 5, to receive the floor flange 6 of a socket or bell 7, the lower surfaces of the flanges 4 and 6 being on a horizontal line and both bearing on the floor and the socket or bell receiving the thimble 3 and making a tight metal to metal joint therewith.

In Fig. 1 which shows my improved connection in the form known as a "bend", the connection is designated 8 and consists of a section of curved metal pipe which is rendered flexible for a portion of its length by being corrugated, undulated, or ribbed and grooved as at 9, the corrugations, undulations or ribs and grooves being parallel and of any desired or required contour, preferably that illustrated and in which the ribs and grooves are devoid of sharp angles and the walls of the internal grooves are at sufficient angle to the longitudinal axis of the pipe to prevent the lodgment of solid matter thereupon.

The bend 8, is connected to the socket or bell 7 by an ordinary soldered joint 10 and is connected to a vertically arranged soil pipe (not shown) by a T—Y 11, a nipple 12 being interposed between the bend 8 and the T—Y 11 and attached to the bend by a wiped joint 13 and secured in position in the T—Y by calking 14.

In Fig. 2 of the drawing the connection is designated 15 and is straight instead of being curved as in Fig 1 and is rendered flexible for a portion of its length by being corrugated, undulated or ribbed and grooved at 16, in the same manner as the bend 8.

The connection 15 is attached to the socket or bell 7 by a soldered joint 10, and is connected to a horizontally arranged soil pipe, (not shown) by a T—Y 17, a solder nipple 18, being interposed between the connection 15 and the T—Y 17 and attached to the connection 15 by a soldered joint 19 and to the T—Y 17 by a screw-threaded end 20 that screws into the threaded faucet of the T—Y, a nut 21 being formed on the nipple to facilitate screwing it into the T—Y.

In practice, the bell or socket, the connection and the T—Y being attached together and placed in position in the floor and walls, the bowl or closet is placed in position on the floor, the floor flange 4 of the bowl or closet 1, covering the floor flange 6 of the bell or socket 7. The floor flange of the bowl or closet is connected to the floor flange of the bell or socket by means of suitable bolts shown in dotted lines and designated 22. The tightening up of these bolts brings the thimble 3 tightly to its seat in the bell or socket, thus making a tight metal-to-metal joint between the thimble and its seat in the bell or socket.

As it is difficult in manufacturing closets to so exactly locate or fit the thimble that it will exactly seat while the floor flanges of both the closet and the bell are in contact with the floor, the flexible connection will, if the thimble does not contact with its seat, be drawn out or expanded longitudinally in tightening up the bolts, so as to permit a tight joint to be made between the thimble and its seat in the bell or socket. On the other hand if the thimble seats before the closet rests on the floor, the latter may be recessed and the bell pressed down, the connection being compressed and shortened by this operation.

After the parts have been connected up as described, various changes may take place in the relative positions of the closet and the soil pipe by the settlement or shrinkage of the building or of some parts of the drainage system. The floor may sink in a vertical direction relatively to the soil pipe, thus lowering the closet, or the soil pipe may sink or settle in a vertical direction while the floor remains stationary, or both the floor and the soil pipe may sink vertically but to different degrees, or one may change its angle relatively to the other. These and many other contingencies that may arise will be all automatically compensated for without detriment to any of the parts or any impairment of the integrity of the joints by the flexibility of the corrugated connection, which will yield lengthwise in either direction, being lengthened or shortened accordingly as it is subjected to tension or to compression. Even a change in the relative angular position of the closet and the soil pipe will not deleteriously affect the system as, in such an event, the flexible connection will be expanded on one side and contracted on the other and the last named faculty may be made available in the original setting up of the closet, if the floor should not be level as, in that event, the closet may, after being connected to the bell as before described, be pressed down so as to bear squarely on the floor all around, the flexible connection yielding at any side and accommodating itself to the change in position of the closet.

I claim:

1. The combination with a water-closet and soil pipe, of a longitudinally flexible, one piece, soft metal pipe or conduit, located below the floor line of the closet and connected by means of a floor flange and soldered joint to the closet bowl and by means of a soldered joint and a nipple to the soil pipe.

2. The combination with a water-closet and a soil pipe of a longitudinally and laterally flexible pipe or conduit connected to the water-closet and to the soil pipe.

3. The combination with a water-closet and a soil pipe of a longitudinally and laterally flexible soft metal pipe or conduit connected to the water-closet and to the soil pipe.

4. The combination with a water-closet and a soil pipe of a longitudinally and laterally flexible pipe or conduit having circumferential corrugations, said pipe being connected to the water-closet and to the soil pipe.

5. The combination with a water-closet and a soil pipe of a longitudinally and laterally flexible soft metal pipe or conduit having circumferential corrugations, said pipe being connected to the water-closet and to the soil pipe.

6. The combination with a water-closet and a soil pipe of a longitudinally and laterally flexible soft metal pipe having corrugations completely surrounding the pipe for a portion only of its length and being connected to the water closet and the soil pipe.

7. The combination with a water-closet and a soil pipe of a soft metal bend connected to the water-closet and to the soil pipe, said bend having a portion of its length laterally and longitudinally flexible and the remainder of its length rigid.

In testimony whereof I have affixed my signature, in presence of two witnesses.

JOSEPH J. COSGROVE.

Witnesses:
CLYDE B. NEIKERT,
JOSEPH B. CONNOLLY.